No. 615,279. Patented Dec. 6, 1898.
W. E. JONES.
HOSE COUPLING.
(Application filed May 14, 1897.)
(No Model.)
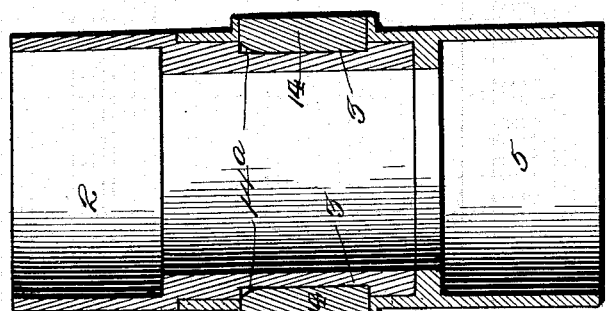
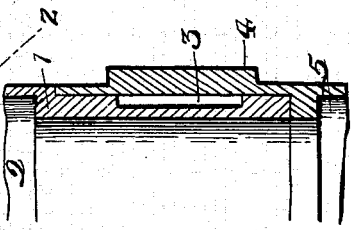
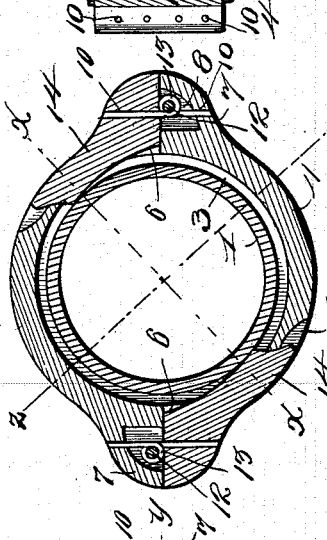
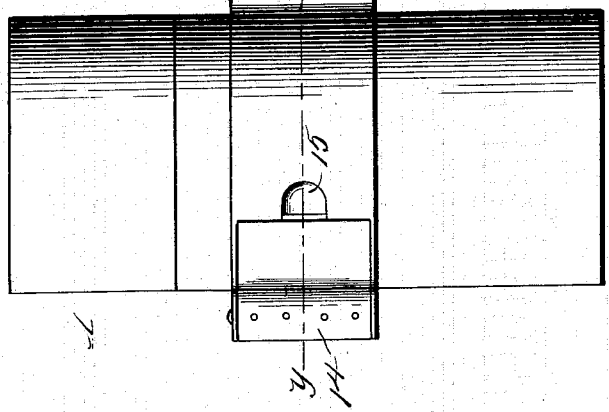
Witnesses
Inventor
William E Jones,
By John Wedderburn. Attorney

UNITED STATES PATENT OFFICE.

WILLIAM E. JONES, OF ST. LOUIS, MISSOURI, ASSIGNOR OF ONE-THIRD TO JULIA A. MICHAUD, OF SAME PLACE.

HOSE-COUPLING.

SPECIFICATION forming part of Letters Patent No. 615,279, dated December 6, 1898.

Application filed May 14, 1897. Serial No. 636,513. (No model.)

*To all whom it may concern:*

Be it known that I, WILLIAM E. JONES, of St. Louis, State of Missouri, have invented certain new and useful Improvements in Hose-Couplings; and I do hereby declare the following to be a full, clear, and exact description of the invention, such as will enable others skilled in the art to which it appertains to make and use the same.

My invention relates to improvements in hose-couplings, and has for its object to provide a simple and improved form of coupler which can be constructed of any desired size to fit any corresponding-size hose and which shall be of the automatic-locking type.

A further object is to provide a hose-coupler with a comparatively smooth exterior surface which will not catch in any obstructions and is especially adapted to fire use.

To this end my invention consists in certain novel details of construction hereinafter fully described and claimed.

In the accompanying drawings, Figure 1 is a side elevation of my device when locked. Fig. 2 is a longitudinal section therethrough on the line $xx$ of Fig. 3, and Fig. 3 is a cross-section on the line $yy$ of Fig. 1. Fig. 4 is a fragmental cross-section on line $zz$ of Fig. 3.

The numeral 1 indicates the male member, having a sleeve 2 adapted to fit upon a piece of hose. A groove 3 is formed around the exterior portion of this member for purposes hereinafter explained.

The numeral 4 indicates the female member, which is provided with a sleeve 5 similar to the sleeve 2 of the male member. Openings 6 are provided in the side of said member, and a hollow lug 7 is formed at or near the edge of each of these openings. The lug 7 is provided with a semicircular recess 8, communicating with the exterior portion of the coupling by means of a plurality of openings 10. A pin 12 is held within the recess 8. Spiral springs 13 are loosely coiled upon the pin 12, the ends being held in the openings 10. A pawl 14, adapted to fit and close the opening 6, is provided with similar openings 10 (indicated by the same numerals) as are provided on the said lug. The opposite ends of the springs project within the openings 10 of the pawl, the construction being such as to permit the free end of the pawl to be sprung out of the groove 3. A bevel face 14ª is provided on each of the pawls to permit the easy entrance of the opposing member of the hose-coupling, and thumb-holes 15 are provided in the body of the device to permit of said pawls being withdrawn from said opening 6.

In order to operate my device, it is simply necessary to slip one member of the coupling inside of the other one, when it is automatically locked. To unlock the same, the pawls are lifted, when it may be readily withdrawn. It is plain that as the pawls are pivoted on axes parallel with the longitudinal axis of the coupling and in coupling and uncoupling move in a plane transverse thereto they are, even if caught by obstruction when the hose is dragged, not liable to be forced open thereby, as would be the case if they moved in a plane parallel with the axis of the coupling. The manner of applying the spring affords many advantages over that now in common use. The spring is entirely covered, and sufficient length is left between the coil and bearing-pins of the ends to obtain the advantage of the full leverage. Thus the coupling forms an efficient means for accomplishing the purpose heretofore set forth.

It is obvious that many minor changes may be made in the form of this device without departing from the spirit thereof. I do not, therefore, desire to confine myself to the exact form herein shown and described, but wish to include all such forms as may properly come within the scope of the invention.

Having thus described my invention, what I claim as new, and desire to secure by Letters Patent, is—

1. In a hose-coupling, the combination of male and female members, each provided with means of attachment to a hose, the male member having an exterior circumferential groove, and the female member having openings in its sides registering with the said groove, of locking-pawls, moving in a transverse plane, contained in the openings of the female member and the groove of the male member, to secure the members together, substantially as described.

2. In a hose-coupling, the combination with a male member provided with the means of securing a hose thereto and having an external groove extending therearound, of a female member provided with openings in the side thereof, and spring-actuated lugs adapted to enter the body of said member through said opening and coact with the groove of the opposing member to lock the same together, substantially as described.

3. In a hose-coupling, the combination with a male member provided with means for securing the same to a hose and having an external groove therearound, of a female member having holes in the sides thereof, lugs provided with a spring-cavity formed upon said female member, pawls provided with similar spring-cavities, springs held therein and secured to said member and said pawls, as and for the purpose set forth.

4. In a hose-coupling, the combination with a female member provided with means for securing the same to a hose and having openings in the side thereof, of lugs formed upon said female member provided with a spring-cavity having a plurality of openings extending from said recesses to the exterior portion of said lugs, pawls adapted to act within the openings in the side of said member, openings in said pawl communicating from said recesses to the exterior portion of said pawls, springs held within said cavities and having their ends secured in the openings communicating with the exterior of said lugs and said pawls, substantially as described.

In testimony whereof I have signed this specification in the presence of two subscribing witnesses.

WILLIAM E. JONES.

Witnesses:
JAMES P. STEWART,
HENRY W. SALOMON.